Patented June 22, 1926.

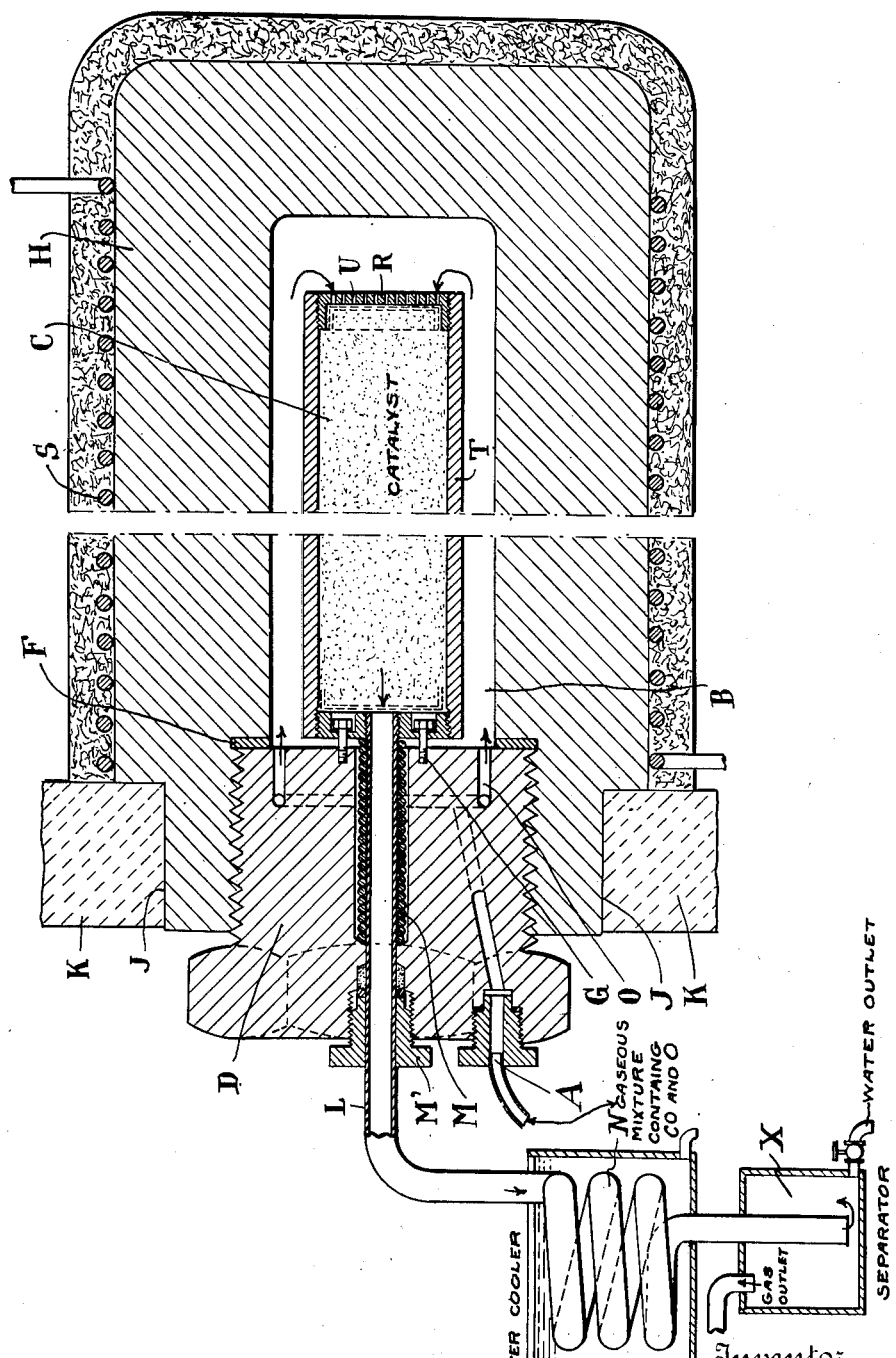

1,589,628

UNITED STATES PATENT OFFICE.

GEORGES CLAUDE, OF PARIS, FRANCE, ASSIGNOR, BY MESNE ASSIGNMENTS, TO LAZOTE INC., A CORPORATION OF DELAWARE.

PURIFICATION OF GASES FOR AMMONIA SYNTHESIS.

Application filed March 25, 1922, Serial No. 546,902, and in France March 25, 1921.

This invention relates to the purification of gaseous mixtures containing nitrogen and hydrogen intended for use in the direct synthesis of ammonia under hyperpressure and has for its object the provision of an improved process and apparatus whereby carbon monoxide, oxygen or both of these gases, when present as undesirable impurities, may be removed from the gaseous mixture in an efficient and economical manner.

The utilization of hyperpressures permits the introduction of many improvements in the synthesis of ammonia and the avoidance of various difficulties experienced in that synthesis as previously known. One of the important advantages is the possibility of separating carbon monoxide, oxygen or both of these gases from the gaseous mixture without resort to the expensive procedure heretofore considered to be necessary.

I have discovered that the gases mentioned as present as impurities in the mixture of nitrogen and hydrogen may be readily removed therefrom when the gaseous mixture is compressed to hyperpressures, i. e., 400 to 2000 atmospheres, by causing the gaseous mixture to contact, even at relatively low temperatures, with a catalyzing material having iron as its basis. This catalyzing material may be fresh, that is to say, prepared for the purpose, or it may be the spent material from the chamber in which the synthesis is accomplished. The carbon monoxide, oxygen or both of these gases are removed from the gaseous mixture by this procedure even when the catalyzing material has been previously used in the synthesis and will no longer efficiently catalyze the reaction between the nitrogen and hydrogen. The purification is effective with relatively large proportions of carbon monoxide, which may exceed 5% of the gaseous mixture, and even when the impurity is present in such considerable quantity it may be removed completely by the procedure described. Moreover, this remarkably complete elimination of the impurities will continue for a very considerable time before it is necessary to change the catalyst. Owing to the use of hyperpressures and particularly when the process is carried out in apparatus similar to that illustrated in my copending application Serial No. 524,087, filed December 22, 1921, the purification proceeds rapidly and permits the operation of the desired synthesis with regularity while the replacing of the spent catalyzing material for the purification is easily effected when necessary.

In order that the invention may be clearly understood the preferred form of apparatus is diagrammatically illustrated in the accompanying drawing, it being understood that changes in the form, proportions and other details of the apparatus may be made without departing from the invention which is not limited to the utilization of any particular apparatus.

Referring to the drawing, the pressure-sustaining tube H is insulated externally against the conduction of heat as far as the vicinity of its head D which is screwed to the inside of the tube H with an hermetic joint F.

The catalyzing material C is placed in an inner tube T. The mixture of gases to be treated, which contains or may contain carbon monoxide, oxygen or both of these gases in greater or less amounts, enters through the orifice A located in the head D, circulates in the annular space B around the tube T and is thereby heated. It is then delivered to the catalyzing material C in the tube at a temperature which is subject to control by means of heating coils S with which the tube is provided. The carbon monoxide in the gaseous mixture is converted into methane and water, a small amount of free carbon being produced also. Any oxygen which is present is combined with hydrogen to form water. The water is condensed together with any ammonia which is formed by the reaction, for example, by passing the gases first through a water-cooled coil N and then through a separator X which is emptied frequently. The purified mixture containing the methane which does not poisonously affect the ammonia synthesis catalyst then passes to the ammonia catalyzing tubes where the synthesis is accomplished. If necessary the gaseous mixture to be treated is also heated in a temperature exchanger before entering at A.

The iron forming the basis of the catalyzing material in the purification tube is carburized very slowly perhaps until a state of equilibrium is reached and the life of this material is such that it does not require replacement more frequently than that in the tubes in which ammonia production is effected. If the temperature of the purification or protective catalyzer tube is maintained at a value about 400 to 450° C. that is to say below that in the tubes wherein the ammonia synthesis is conducted, little ammonia is formed in the purification tube and that formed is removed with the water produced by the transformation of the impurities present.

It is not essential that the inner tube of the purification catalyzer be heat insulated as is preferable in the case of the ammonia catalyzing tubes (see the copending application above identified) and the use of a special temperature exchanger may be avoided by the elimination of the heat insulation in the purification catalyzer. The purification and ammonia catalyzing tubes are not then interchangeable if the most efficient results are expected.

From the foregoing description it will be observed that I have provided a novel method of and apparatus for purifying gaseous mixtures to remove carbon monoxide and oxygen therefrom in connection with the synthesis of ammonia. While the preferred mode of operation to accomplish this result is set forth above, the details of the operation may be varied without departing from the invention or sacrificing any of the advantages thereof. The phrase "carbon monoxide and oxygen" as used in the accompanying claims is intended to indicate that either or both of these gases if present can be removed from the gaseous mixture by the application of the process described.

I claim:

1. A process of purifying gases for the synthetic manufacture of ammonia by the aid of a catalytic agent, in which the purification of the gaseous mixture of hydrogen and nitrogen containing carbon monoxide and oxygen to be subjected to the synthesis is effected by the removal to a practically complete extent of the carbon monoxide and oxygen in the mixture of gases by passing the gases over a heated catalytic material.

2. A process of purifying gases for the synthetic manufacture of ammonia by the aid of a catalytic agent and under the action of high temperatures and hyperpressures, in which the purification of the gaseous mixtures of hydrogen and nitrogen containing carbon monoxide and oxygen to be subjected to the synthesis is effected by the removal to a practically complete extent of the carbon-monoxide and oxygen by passing the said gases in the hyper-compressed condition over a heated catalytic material having a basis of iron.

3. A process of purifying gases for the synthetic manufacture of ammonia by the aid of a catalytic agent and under the action of high temperatures and hyper-pressures, in which the purification of the gaseous mixtures of hydrogen and nitrogen containing carbon monoxide and oxygen to be subjected to the synthesis is effected by the removal to a practically complete extent of the carbon-monoxide and oxygen by passing the said gases in the hyper-compressed condition over a heated catalyzing material having a basis of iron, the said catalyzing material being the spent material used for the synthesis.

4. A process of purifying gases for the synthetic manufacture of ammonia by the aid of a catalytic agent and under the action of high temperatures and hyper-pressures, in which the purification of the gaseous mixtures of hydrogen and nitrogen containing carbon monoxide and oxygen to be subjected to the synthesis is effected by the removal to a practically complete extent of the carbon-monoxide and oxygen by passing the said gases in the hyper-compressed condition over a catalytic material having a basis of iron at a temperature of about 400° to 450° C.

5. A process of purifying gases for the synthetic manufacture of ammonia by the aid of a catalytic agent and under the action of high temperatures and hyper-pressures, in which the purification of the gaseous mixtures of hydrogen and nitrogen containing carbon monoxide and oxygen to be subjected to the synthesis is effected by the removal to a practically complete extent of the carbon-monoxide and oxygen by passing the said gases in the hyper-compressed condition over a heated catalytic material having a basis of iron and removing the resulting water by condensation.

6. The method of effecting the purification of a gaseous mixture of hydrogen and nitrogen containing carbon monoxide and oxygen intended for the synthetic production of ammonia by the employment of hyper-pressures, which consists in passing the mixture in the hyper-compressed condition over a heated catalysing material having a basis of iron contained in a tube which is interchangeable with the catalysing tubes wherein the production of ammonia is effected.

7. A process of purifying gases for the synthetic manufacture of ammonia by the aid of a catalytic agent under pressure, in which the purification of the gaseous mixture of hydrogen and nitrogen containing carbon monoxide and oxygen to be subjected to the synthesis is effected by the removal to a practically complete extent of the carbon monoxide and oxygen by passing the said gases under pressure over a heated catalyst and removing water from the compressed gases.

8. A process of purifying gases for the synthetic manufacture of ammonia by the aid of a catalytic agent under pressure, in which the purification of the gaseous mixture of hydrogen and nitrogen containing carbon monoxide and oxygen to be subjected to the synthesis is effected by the removal to a practically complete extent of the carbon monoxide and oxygen by passing the said gases under pressure over a heated catalyst and thereafter removing water from the compressed gases by condensation.

9. A process of purifying gases for the synthetic manufacture of ammonia by the aid of a catalytic agent under pressure, in which the purification of the gaseous mixture of hydrogen and nitrogen containing carbon monoxide and oxygen to be subjected to the synthesis is effected by the removal to a practically complete extent of the carbon monoxide and oxygen by passing the said gases under pressure over a heated catalytic material having a basis of iron and thereafter removing water from the compressed gases.

10. A process of purifying gases for the synthetic manufacture of ammonia by the aid of a catalytic agent under pressure, in which the purification of the gaseous mixture of hydrogen and nitrogen containing carbon monoxide and oxygen to be subjected to the synthesis is effected by the removal to a practically complete extent of the carbon monoxide and oxygen by passing the said gases under pressure over a heated catalyst having a basis of iron and thereafter removing the water from the compressed gases by condensation.

11. A process of purifying gases for the synthetic manufacture of ammonia by the aid of a catalytic agent under pressure, in which the purification of the gaseous mixture of hydrogen and nitrogen containing carbon monoxide and oxygen to be subjected to the synthesis is effected by the removal to a practically complete extent of the carbon monoxide and oxygen by passing the said gases under pressure over a heated catalyst and thereafter removing water and ammonia from the compressed gases.

12. A process of purifying gases for the synthetic manufacture of ammonia by the aid of a catalytic agent under pressure, in which the purification of the gaseous mixture of hydrogen and nitrogen containing carbon monoxide and oxygen to be subjected to the synthesis is effected by the removal to a practically complete extent of the carbon monoxide and oxygen by passing the said gases under pressure over a heated catalyst having a basis of iron and thereafter removing water and ammonia from the compressed gases by condensation.

13. A process of purifying gases for the synthetic manufacture of ammonia by the aid of a catalytic agent under pressure, in which the purification of the gaseous mixture of hydrogen and nitrogen containing carbon monoxide and oxygen to be subjected to the synthesis is effected by the removal to a practically complete extent of the carbon monoxide by passing the said gases under pressure over a heated catalytic material, and removing a liquefiable product of the purification from the compressed gases by external cooling.

In testimony whereof I affix my signature.

GEORGES CLAUDE.